July 24, 1956     H. L. LEWIS     2,755,745
SELF WATERING CONTAINER
Filed May 28, 1951     2 Sheets-Sheet 1
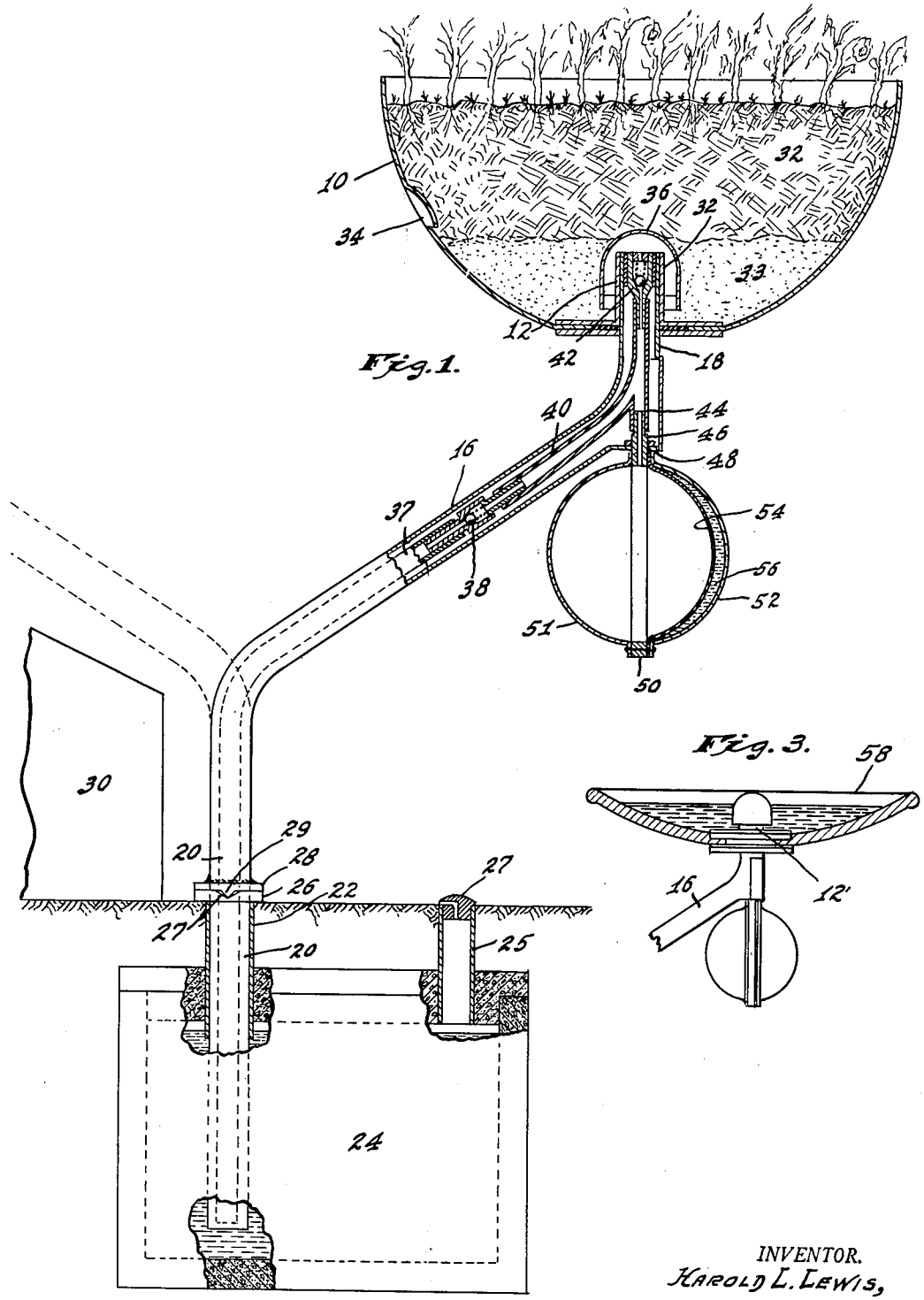
INVENTOR.
HAROLD L. LEWIS,
BY
ATTORNEYS.

July 24, 1956 H. L. LEWIS 2,755,745
SELF WATERING CONTAINER
Filed May 28, 1951 2 Sheets-Sheet 2
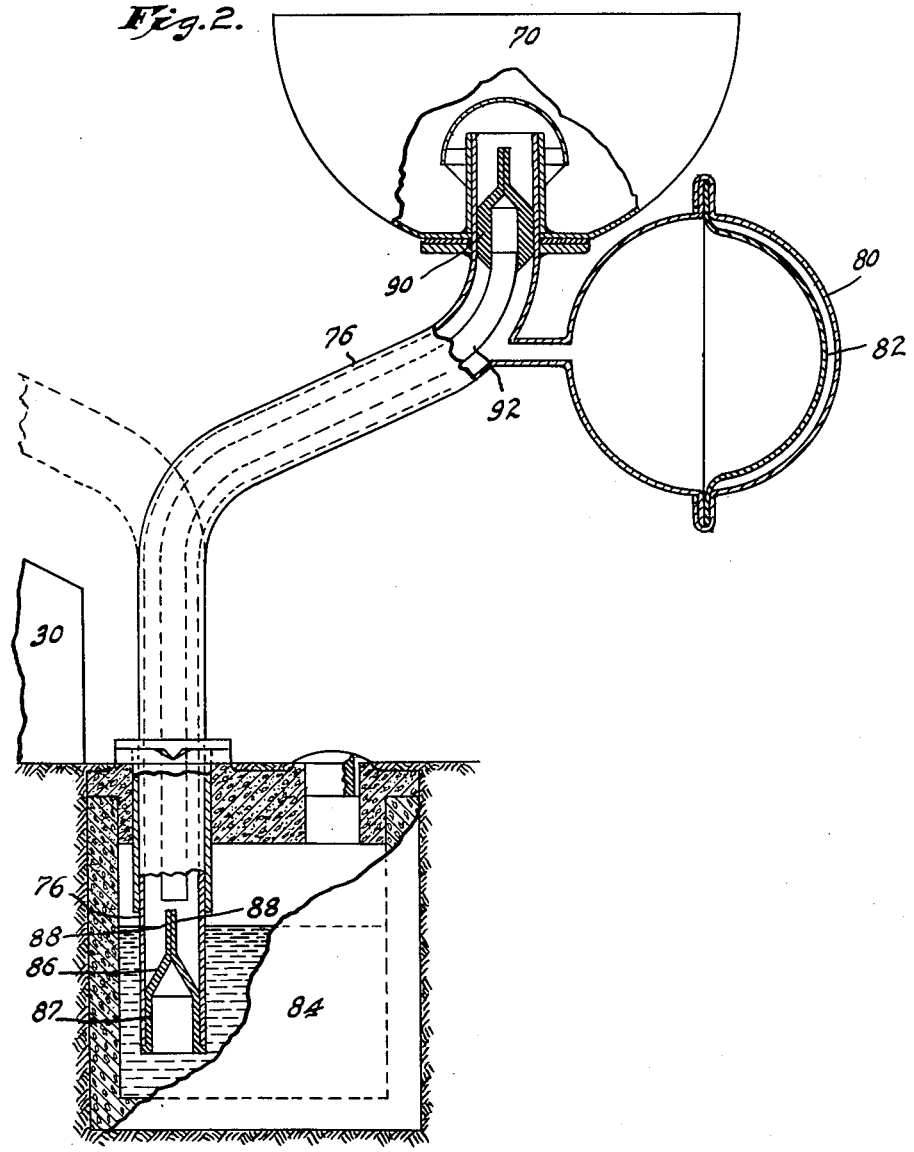
INVENTOR.
HAROLD L. LEWIS,
BY
Schly, Nash + Jenkins
ATTORNEYS.

United States Patent Office 2,755,745
Patented July 24, 1956

2,755,745

SELF WATERING CONTAINER

Harold L. Lewis, Indianapolis, Ind.

Application May 28, 1951, Serial No. 228,604

13 Claims. (Cl. 103—152)

This invention relates to a self-watering container, especially advantageous for use in cemeteries to contain floral arrangements.

A difficult and expensive problem involved in the maintenance of a cemetery is the watering of the various flower arrangements. Regular watering is necessary, and in well kept cemeteries it is done two or three times a week, and in hot dry weather even this is not sufficient to maintain the desired good health and appearance of the floral arrangements. Heretofore, watering has been done by hand, and is a slow operation requiring many man-hours of work and a corresponding large expense.

It is the object of my invention to provide a container for flowers and other plants and a support therefor which will automatically keep the floral arrangements properly watered and which will be suitable and advantageous for use in cemeteries. It is an object of my invention to provide a self-watering device which will be operated by "the elements," i. e. by atmospheric forces. It is an object of my invention to provide such a device in which the amount of water supplied to the floral arrangement will be automatically proportioned to the needs created by weather conditions.

In accordance with my invention, I connect a container to a water supply system which contains a supply source and a pump, and I actuate the pump with a temperature-responsive device responsive to temperature changes induced therein by changes in the conditions of the elements, as between day-time and night-time conditions. Preferably I provide an underground supply tank and mount the container on a support carried by the tank. Desirably and as shown herein, the support is an off-set pivoted leg embodying the invention of my copending application Serial No. 228,603, filed May 28, 1951. In a preferred form of my invention, I use the temperature-response of a fluid to actuate the pump. For this, I connect the container to the water storage tank by a valved conduit, desirably extending through the support, and I operatively connect thereto an expansion chamber responsive to cyclic changes in weather conditions. The weather-induced temperature variations in the expansion chamber cause expansions and contractions—or vaporizations and condensations—which act to carry water from the tank to the container. The watering action produced by changes in conditions of the elements may be made roughly proportional to the demand for water produced by weather conditions.

The accompanying drawings illustrate my invention. In such drawings, Fig. 1 is a partial vertical section showing a self-watering floral container embodying my invention; Fig. 2 is a similar section showing a modified embodiment of my invention; and Fig. 3 shows a modification in which the self-watering means of Fig. 1 is used to supply a birdbath.

In the embodiment of my invention shown in Fig. 1, the container 10 is carried by a mounting socket 12 supported on a leg 16 which has a vertical upper end 18 received in the socket 12. The leg 16 is reversely bent through two 45° arcs so that its lower end forms a pivot 20 parallel with and offset from its upper end 18. The amount of offset may be varied, but is desirably sufficient so that the flower arrangement in the container 10 will be wholly at one side of the axis of the pivot 20. The pivot 20 is received in a tubular socket 22 supported by an underground water-supply tank 24. The tank 24 has a fill pipe 25, closed by a vented closure 27. The upper end of the socket 22 is provided with a collar 26, and the leg 16 with a collar 28 resting on the collar 26 to support the leg 16 at the desired elevation. Preferably, the collars 26 and 28 are respectively provided with a notch 27 and cooperating detent 29 which interengage to hold the leg 16 releasably in a predetermined position but which readily permit manual swinging of the leg 16 from its predetermined position shown in full lines in Fig. 1 to other positions such as that shown in dotted lines in Fig. 1.

The socket 22 may be positioned close to a headstone 30. When it is desired to mow the lawn, the leg 16 may be pivoted about the axis of the socket 22 to carry it to the temporary dotted line position shown, where the container and leg will overlie the headstone 30 and permit the mower to operate close to the headstone 30.

The container 10 is adapted to contain soil 32 in which flowers and plants may be grown. Its lower portion may be filled with sand or gravel 33 to retain and distribute water, and the bowl 10 may have one or more drain openings 34 intermediate its height. The mounting sleeve 12 is covered by an inverted cup 36 to keep dirt from interfering with the operation of the watering mechanism.

The leg 16 is hollow, and its lower end extends to a point close to the bottom of the tank 24 and below the normal water level. The hollow leg 16 contains a water conduit 37 connected through an upwardly opening check valve 38 to the lower branch of a conduit 40. The upper end of this conduit 40 is connected to an upwardly opening check valve 42 whose outlet discharges to the space between the sleeve 12 and the inverted cup 36 of the bowl 10, so that water discharged therefrom will flow to the sand bed 33 for distribution to the soil 32 to support the growth of the plants.

A branch 44 of the conduit 40 is connected to a nipple 46 extending through and supported in the wall 48 of the hollow leg 16. The nipple 46 is attached to and supports a ring 50 against the opposite sides of which are mounted a pair of hemispherical walls 51 and 52, to form an expansion ball exposed to the weather. A diaphragm 54 is mounted within the expansion chamber, as by securing its edges between the wall 52 and the ring 50. The diaphragm 54 may be pre-formed to substantially hemispherical shape so that in normal position it lies extended toward the wall 52 with a closed space 56 between the diaphragm and the wall 52 which is relatively small in comparison with the total volume of the expansion ball.

The closed space 56 is filled with a liquid of a selected boiling point. The liquid may be a single liquid or a mixture, and it is selected to provide a boiling point within the normal range of temperature variations produced within the expansion ball by weather-condition changes. For example, under normal weather conditions which would require watering the plants in the bowl 10, the daytime atmospheric temperature and/or the effect of the sun's rays on the expansion ball will normally raise the temperature within the ball to a point in excess of say 115° F., whereas the night-time atmospheric temperature and the absence of the sun's rays on the expansion ball will cause the temperature therein to drop to a point below say about 80°. Under these circumstances, the liquid in the space 56 is selected or mixed to provide a boiling point within the range of 80 to 115° F. Any liquid or mixture having a suitable boiling point can be used, for example, any of a number of volatile organic liquids, such as liquid hydrocarbons, ethers, etc., and I have used ether, boiling at 100° F. Aqueous solutions may also be used, and I have used a 27% aqueous solution of ammonia, boiling at 110–115° F., which is relatively inexpensive.

The self watering operation is as follows.

It is assumed that the tank 24 is filled with water and that the liquid in the space 56 has a boiling point of 100° F. With a night-time temperature condition prevailing, the liquid in the space 56 is condensed, and the parts will be as shown in Fig. 1, with the diaphragm distended to the right toward the wall 52 of the expansion ball. If the daytime weather conditions on the following day are such as to require watering, the temperature will be high enough and the sun will shine enough to raise the temperature within the expansion ball, at least during some part of the day, to a temperature in excess of the 100° boiling point of the liquid in the space 56. It is not essential, of course, that the atmospheric temperature itself exceed 100° F. for the temperature in the confined space within the ball may well exceed the prevailing atmospheric temperature. This can be controlled in part by the nature of the ball surface, and a heat-absorbing surface can be used. Under the elevated temperature, the liquid in the space 56 will vaporize and expand to force the diaphragm 54 to the left. This will decrease the free space within the expansion ball, and will discharge the contents thereof through the conduit 40 and the check valve 42. The following night, the temperature in the expansion ball will drop and the vapor or liquid in a space 56 will contract and condense. This will draw the diaphragm 54 to the right, to expand the free space within the expansion ball. This will draw water from the tank 24 up through the conduit 37, the valve 38, and the conduit 40 into the expansion ball. The following day, when the temperature in the expansion ball again rises, the vaporization and the expansion of the liquid in the space 56 will again force the diaphragm 54 to the left to expel water therein through the upper end of the conduit 40 and through the check valve 42, where it will flow to the sand bed 33 in the bowl 10.

This cyclic heat pumping action will continue day by day, and as long as a supply of water is maintained in the storage tank 24, the soil bed 32 in the bowl 10 will be kept moist. The cyclic operation of the expansion ball will occur not only from the rise and fall of temperatures between daytime and night-time conditions, but varying weather conditions during a single day will often be sufficient to cause at least partial pumping strokes of the diaphragm 54.

The offset leg 16 and the heat-pump self-watering mechanism is not limited to use with floral containers, but may be used in other situations where it is desired to maintain a corresponding supply of water. This is exemplified in Fig. 3, where the container of Fig. 1 is replaced by a birdbath 58. The construction of the leg 16 and its water-pumping mechanism is identical with that shown in Fig. 1, and the birdbath 58 is provided with a mounting sleeve 12' corresponding to the sleeve 12 of the bowl 10 and having a corresponding function.

Fig. 2 shows a modified construction. The hollow leg 76 is essentially the same as the leg 16 of Fig. 1, but is desirably of somewhat larger inside diameter. The bowl 70 is similar to the bowl 10, and is similarly mounted and has similar functions. Here, however, an expansion chamber 80 is supported in a position projecting horizontally from the upper portion of the leg 76 where it will be more likely to receive the rays of the sun, and its outside is suitably formed or coated to provide a heat-absorption surface. It may contain a diaphragm 82, although this is not essential, and it contains no low-boiling liquid.

The space within the expansion ball 80 is openly connected to the space within the leg 76. The lower end of that leg 76 contains a check valve 86. This may be a ball type check valve like the valves 38 and 42 of Fig. 1. Preferably, however, it is of flexible material such as rubber, formed with a tubular portion 87 adapted to be frictionally engaged in the open lower end of the leg 76. The upper portion of the valve is flattened, to provide two parallel walls 88 normally lying in contact with each other and extending upward from the tubular portion 87. Liquid tending to flow upward through the valve 86 will readily force the walls 88 apart and pass between them. Liquid tending to flow downwardly through the valve 86 will press against the outer surfaces of the walls 88 and press them together to prevent flow between them.

The upper end of the leg 76 is provided with a similar check valve 90 seated within the open upper end of the leg 48. Its inlet is connected to a conduit 92 extending downwardly through the leg 48 to a point closely above the lower valve 86.

In this case, when a temperature rise expands the air within the expansion ball 80, this is vented through a path leading downwardly through the leg 76 to the bottom end of the conduit 92 and thence upward through that conduit 92 and through the upper check valve 90 into the bowl 70. As the air within the ball 80 subsequently contracts, it draws water from the storage tank 84 inwardly through the lower check valve 86 into the lower end of the leg 76, to a point above the lower inlet end of the conduit 92. Upon subsequent expansion of the air in the ball 80, the water thus brought into the lower end of the leg 76 is forced upwardly through the conduit 92 and the valve 90 to supply water to the bowl 70.

In this arrangement of Fig. 2, the ball 80 will normally be dry, and no water will normally be drawn into it. It will thus contain nothing but air, and the expansion and contraction of the air as the result of temperature changes within the ball 80 will produce a pumping action to raise water from the storage tank 84 to the bowl 70. The force of these expansions and contractions may be somewhat less than the pumping force exerted in the mechanism of Fig. 1, but on the other hand the operation will be less dependent upon fluctuations of temperature above and below the boiling point of a low-boiling liquid, and will occur with temperature changes regardless of the position of the range over which those changes occur.

My invention is especially advantageous for use in cemeteries, where it will greatly facilitate the regular maintenance thereof. The extent to which it reduces the frequency of watering services will depend to some extent upon the capacity of the storage tanks provided. But it will make it readily possible to reduce the frequency of such service from two or three times a week to once every two weeks. This will substantially reduce the time and labor required, and the self watering action will insure adequate watering at all times.

I claim as my invention:

1. A self-watering device, comprising a water-supply tank, a container-supporting post pivotally mounted in said tank and having an offset upper end to receive a container, a hollow enclosure depending from the offset upper end of said post, a diaphragm dividing said enclosure and forming an expansible and contractible compartment therein, a temperature-responsive fluid in said compartment, means connecting the enclosure portion outside said compartment for intake communication with said tank and discharge communication with the container-receiving portion of said post.

2. A self-watering device, comprising a water-supply tank, a container support carried by the tank, a container carried by said support at an elevation above said tank, a hollow enclosure carried with said container by said support for exposure to the elements, a conduit leading upward from said tank to said container, said conduit having intake communication with said tank and discharge communication with said container and being in pressure-transmitting communication with said enclosure at a point between said inlet and discharge, said hollow enclosure containing a temperature responsive fluid which upon cooling of said enclosure by the elements contracts to draw liquid into said conduit through its inlet from said tank and to a level above the water level in the tank, and upon heating of said enclosure by the elements expands to discharge such liquid from said conduit through its discharge communication to said container.

3. A self-watering device as defined in claim 2, with the addition of a movable diaphragm in said enclosure to define an expansible closed chamber therein separated from said conduit by its diaphragm, and a vaporizable liquid in said closed chamber having a boiling point in the normal range of temperature changes produced in the enclosure by its exposure to the elements.

4. A self-watering device as defined in claim 2, in which the enclosure is arranged and positioned relative to the container to be exposed to solar heat.

5. A self-watering device as defined in claim 2, in which the enclosure communicates with the conduit at a point near its intake communication with the tank.

6. A self-watering device as defined in claim 2 in which said support is a tubular post containing said conduit, said container and enclosure are carried by said post in unitary relationship therewith, and said tank forms a socket for removably receiving the lower end of the post.

7. A self-watering device as defined in claim 6, in which said enclosure is carried by the post below the container and off-set from the pivotal axis of the post.

8. A self-watering device as defined in claim 7, in which said enclosure contains a movable diaphragm dividing the same into a closed compartment remote from the post axis and an inner compartment communicating with the conduit, the outer wall of said closed compartment having a heat absorbing outer surface.

9. A self-watering device as defined in claim 8, in which the outer compartment contains a vaporizable liquid boiling in the normal range of temperature changes produced in the enclosure by its exposure to the elements.

10. A self-watering device as defined in claim 6, in which the lower end of the post contains a one-way valve opening from the tank to the interior of the post, a tube leads from a point immediately above said valve upwardly through the post, a one-way valve at the top of the post connects said tube for outlet communication with said container, and said enclosure communicates with the space in said post outside said tube at a point above the lower end of the tube.

11. A self-watering device as defined in claim 6, in which the enclosure is positioned below the container and communicates with said conduit through an upwardly leading passage, and said enclosure contains a movable diaphragm dividing the same into a closed expansion chamber and a water-receiving compartment, said water-receiving compartment being in communication adjacent its top with said upwardly leading passage and said closed compartment being exposed to the elements and containing a vaporizable liquid boiling in the normal range of temperature changes produced in said enclosure by its exposure to the elements, whereby expansions and contractions of said expansion chamber will be transmitted to said conduit by water in said water-receiving compartment.

12. A self-watering device as defined in claim 2, in which the enclosure is positioned below the container and communicates with said conduit through an upwardly leading passage, and said enclosure contains a movable diaphragm dividing the same into a closed expansion chamber and a water-receiving compartment, said water-receiving compartment being in communication adjacent its top with said upwardly leading passage and said closed compartment being exposed to the elements and containing a vaporizable liquid boiling in the normal range of temperature changes produced in said enclosure by its exposure to the elements, whereby expansions and contractions of said expansion chamber will be transmitted to said conduit by water in said water-receiving compartment.

13. A self-watering device, comprising a water supply tank, a container support terminating at its upper end in a tubular container-receiving portion, a water outlet passage extending upwardly through said portion, a container having a tubular socket adapted to be received in supporting engagement on said portion, the water outlet from the assembled socket and portion being above the bottom of said container, and a protective cover carried by said container overlying said outlet and forming with said socket a downward drain passage leading from said outlet toward the bottom of the container, pumping means carried by said support having intake communication with said tank and outlet communication with said water outlet passage in the container-receiving portion of the container support, said pumping means including and being actuated by a temperature-responsive device exposed to the elements and operatively responsive to element-induced temperature changes therein.

References Cited in the file of this patent

UNITED STATES PATENTS

| | | |
|---|---|---|
| 776,106 | Beurrier | Nov. 29, 1904 |
| 2,278,991 | Hasslacher | Apr. 7, 1942 |
| 2,524,796 | Higgins | Oct. 10, 1950 |